(12) United States Patent
Ford

(10) Patent No.: US 6,880,763 B1
(45) Date of Patent: Apr. 19, 2005

(54) HITCH ASSISTING DEVICE AND METHOD

(76) Inventor: Eugene E. Ford, 0595 W. 350 North, Laporte, IN (US) 46350

(*) Notice: Subject to any disclaimer, the term of this patent is extended or adjusted under 35 U.S.C. 154(b) by 30 days.

(21) Appl. No.: 10/372,566

(22) Filed: Feb. 25, 2003

(51) Int. Cl.[7] .......................... B60M 11/54
(52) U.S. Cl. ...................... 238/14; 238/1; 428/156; 180/9.62
(58) Field of Search .......... 238/14, 1, 10 R; 428/156, 428/120, 119, 143; 116/28 R; 33/286; 180/9, 180/9.2, 9.62, 9.3

(56) References Cited

U.S. PATENT DOCUMENTS

| | | | |
|---|---|---|---|
| 2,532,149 A | * 11/1950 | Cone ............................ | 254/88 |
| 2,746,571 A | 5/1956 | Taylor | |
| 3,878,988 A | * 4/1975 | Blais ........................... | 238/14 |
| 4,469,277 A | 9/1984 | Howes | |
| 5,266,378 A | * 11/1993 | Stephenson et al. ........ | 428/156 |
| 5,862,983 A | * 1/1999 | Andrus et al. ................ | 238/14 |
| 5,865,664 A | * 2/1999 | Martey ........................ | 446/397 |

FOREIGN PATENT DOCUMENTS

WO     WO 9912800 A1 *  3/1999

* cited by examiner

Primary Examiner—Frantz F. Jules

(57) ABSTRACT

A hitch assisting device and method includes a generally planar member having an upper surface and a bottom surface. The planar member has a front edge and a back edge. The upper surface has at least one depression positioned therein. The depression extends between a pair of side edges of the planar member. The tire of the vehicle is positioned in the at least one depression and the trailer unhitched from the vehicle. Thereafter the trailer is aligned with the vehicle when the tire is again positioned in the depression.

4 Claims, 2 Drawing Sheets

HITCH ASSISTING DEVICE AND METHOD

BACKGROUND OF THE INVENTION

1. Field of the Invention

The present invention relates to hitch alignment tools and more particularly pertains to a new hitch alignment tool for allowing a user to align the hitch of a reversing vehicle to a trailer.

2. Description of the Prior Art

The use of hitch alignment tools is known in the prior art. U.S. Pat. No. 4,469,277 describes a back-up guide for trucks or trailers. Another type of hitch alignment tool is U.S. Pat. No. 5,266,378 describes a wheel positioning garage mat that aids a user in parking a vehicle in the desired location. U.S. Pat. No. 2,746,571 describes a portable wheel position indicator.

SUMMARY OF THE INVENTION

The object of the present invention is to provide a new hitch alignment tool that would eliminate the need of moving a trailer to align it with car hitch or the continued repositioning of a vehicle to properly align the hitch.

To this end, the present invention generally comprises a generally planar member having an upper surface and a bottom surface. The planar member has a front edge and a back edge. The upper surface has at least one depression positioned therein. The depression extends between a pair of side edges of the planar member. The tire of the vehicle is positioned in the at least one depression and the trailer unhitched from the vehicle. Thereafter the trailer is aligned with the vehicle when the tire is again positioned in the depression.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty, which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
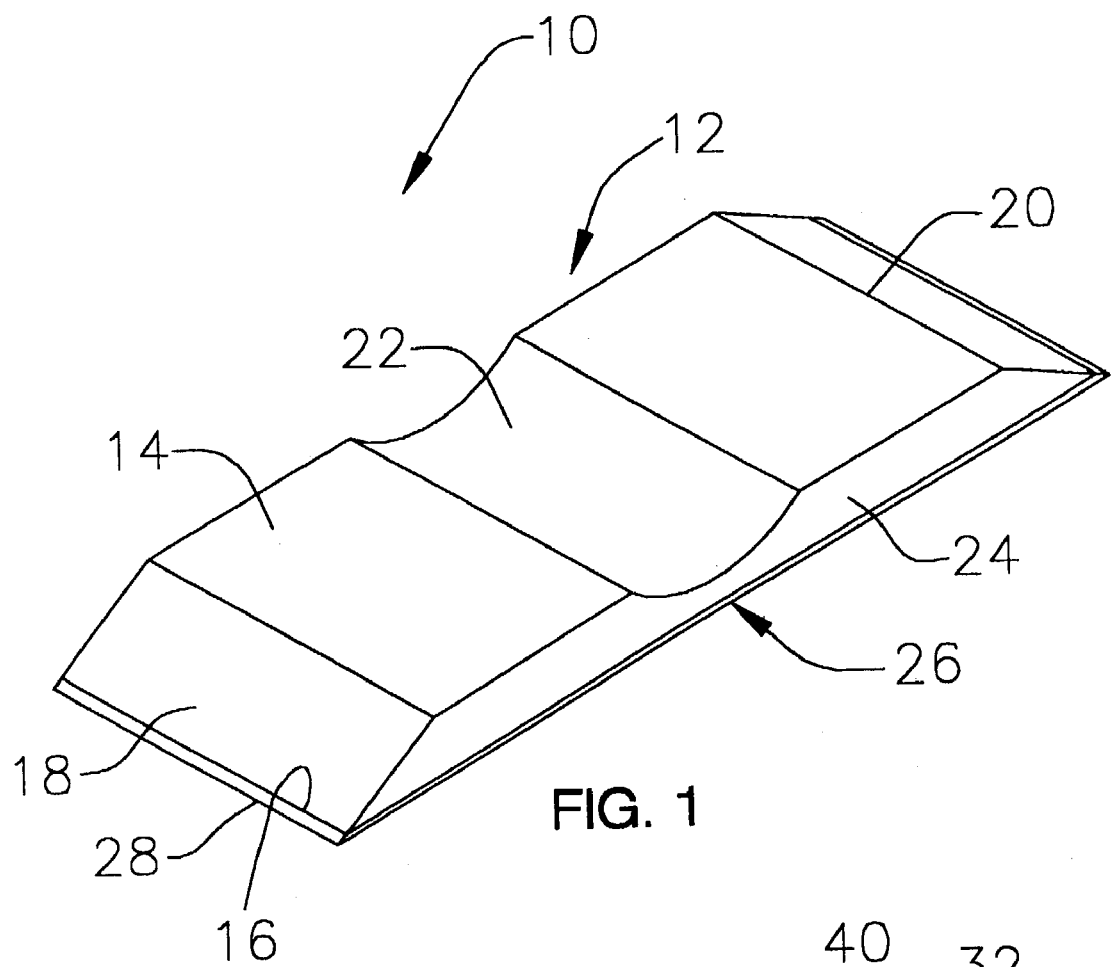
FIG. 1 is a perspective view of a hitch assisting device and method according to the present invention.
Figure 3:
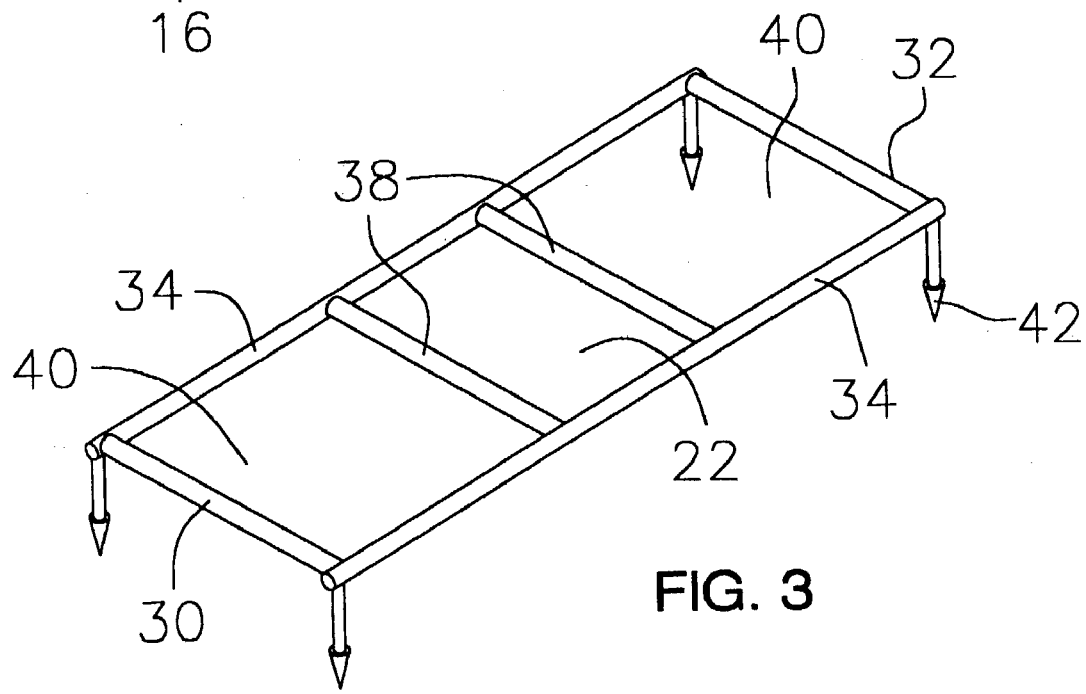
FIG. 3 is a perspective view of the present invention.
Figure 2:
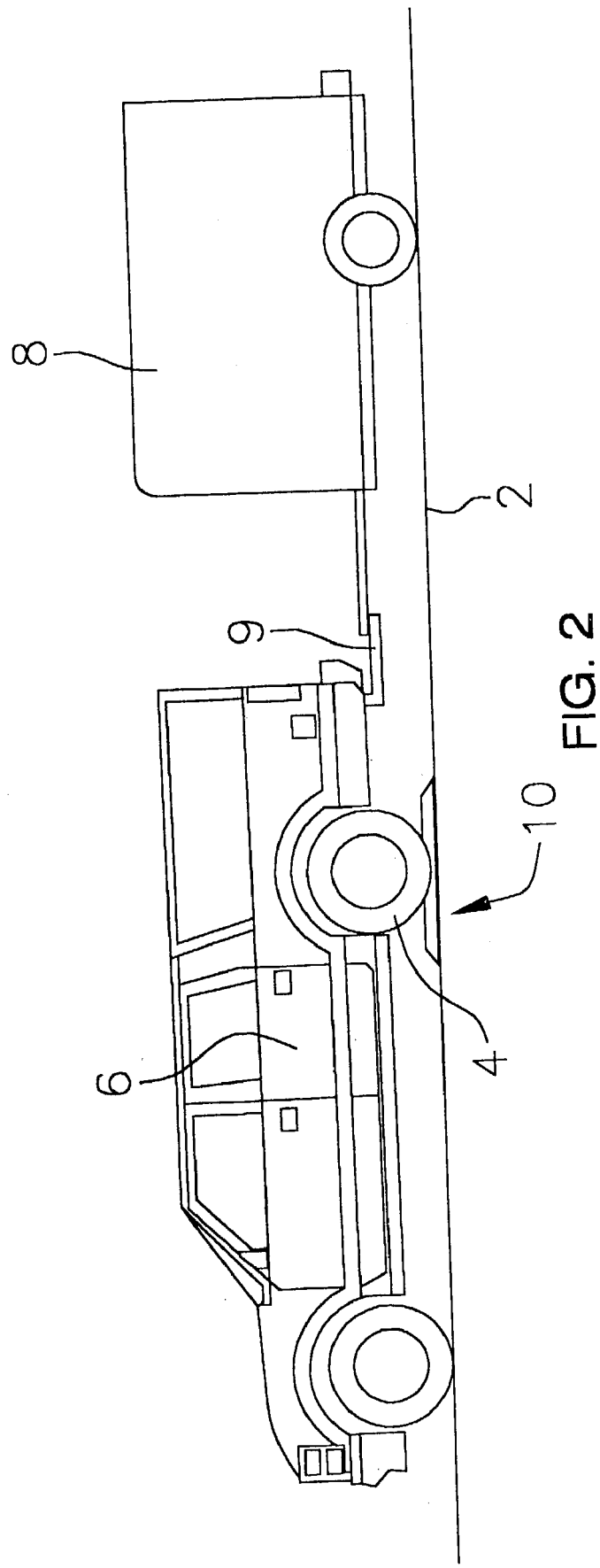
FIG. 2 is an in-use view of the present invention.

With reference now to the drawings, and in particular to FIGS. 1 through 3 thereof, a new hitch alignment tool embodying the principles and concepts of the present invention and generally designated by the reference numeral 10 will be described.

As best illustrated in FIG. 1, the first embodiment of the hitch assisting device and method 10 generally comprises a generally planar member 12 having an upper surface 14 and a bottom surface 16. The planar member 12 has a front edge 18 and a back edge 20. The upper surface 14 has at least one depression 22 positioned therein. The at least one depression 22 is positioned generally between the front 18 and back 20 edges and extends between, and preferably through, a pair of side edges 24 of the planar member 12. The front 18 and back 20 edges are angled inward from the bottom surface 16 to the upper surface 14. The planar member 12 preferably comprises a rigid plastic material.

A non-slip member 26 is attached to the bottom surface 16. The non-slip member 26 comprises a coating that is positioned on and substantially covers the bottom surface 16 of the planar member 12. The coating 28 preferably comprises an elastomeric material.

The second embodiment is depicted in FIG. 3 and includes a front bar 30, a back bar 32 and pair of side bars 34 attached together such that a rectangular configuration is formed. Though a depression 22 is defined within the rectangular, it is preferred that centrally the depression 22 is centrally disposed between a pair of middle bars 38 extending between and is attached to the side bars 34. In this manner, secondary depressions 40 are positioned on either side of the at least one depression 22 which is centrally located. The middle bars 38 are spaced from each other such that the at least one depression 22 is defined between the middle bars 38. The non-slip member 26 attached to the bottom surface 16 of the second embodiment includes a plurality of spikes 42 attached to and extending away from the bottom surface 16. The bars of the second embodiment are preferable comprised of a metal.

In the method of the device, the planar member 12, as described in both embodiments, is positioned on the ground surface 2 behind a rear tire 4 of a vehicle 6 when a hitched trailer 8 is approximately in its desired storage position. The driver drives rearward until a rear tire 4 of a vehicle 6 is positioned in the at least one depression 22. The non-slip member 26 prevents the movement of the rectangular member. The coating 28 is used on hard surfaces like asphalt and concrete while the spikes 42 are used on softer ground such as dirt or gravel. Once the rear wheel is in the depression 22, the user unhitches the trailer 8 from the hitch 9 of the vehicle 6. When the driver desires to again attach the trailer 8 to the hitch 9, the driver positions the car so that the rear wheel is once again in the at least one depression 22. In this position, the driver knows that the hitch 9 is aligned with the trailer 8 for easy re-attachment. This can be repeated whenever the driver unhitches and re-hitches the trailer 8 to the car.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A hitching assistance tool device for receiving a tire of a vehicle when a hitch attached to the vehicle is in a proper alignment and distance from a trailer, said device comprising:

a generally planar member having an upper surface and a bottom surface, said planar member having a front edge and a back edge, said upper surface having at least one depression positioned therein, said depression extending between a pair of side edges of said planar member, said generally planar member comprising a front bar, a back bar and pair of side bars attached together such that a rectangular configuration is formed; and wherein the tire of the vehicle is positioned in the at least one depression and the trailer unhitched from the vehicle, thereafter the trailer is aligned with the vehicle when the tire is again positioned in said depression.

2. The hitching assistance tool device of claim 1, further including a pair of middle bars extending between and being attached to said side bars, said middle bars being spaced from each other such that said at least one depression is defined between said middle bars.

3. The hitching assistance tool device of claim 2, further including a non-slip member being attached to said bottom surface of said planar member.

4. The hitching assistance tool device of claim 3, wherein said non-slip member comprises a plurality of spikes being attached to and extending downward from said bottom surface.

\* \* \* \* \*